B. R. BENJAMIN.
BAGGING MECHANISM FOR HARVESTER THRESHERS OR STRIPPERS.
APPLICATION FILED JAN. 12, 1916.

1,301,362. Patented Apr. 22, 1919.
2 SHEETS—SHEET 1.

Inventor,
Bert R. Benjamin.
By
Chas. E. Lord
Atty.

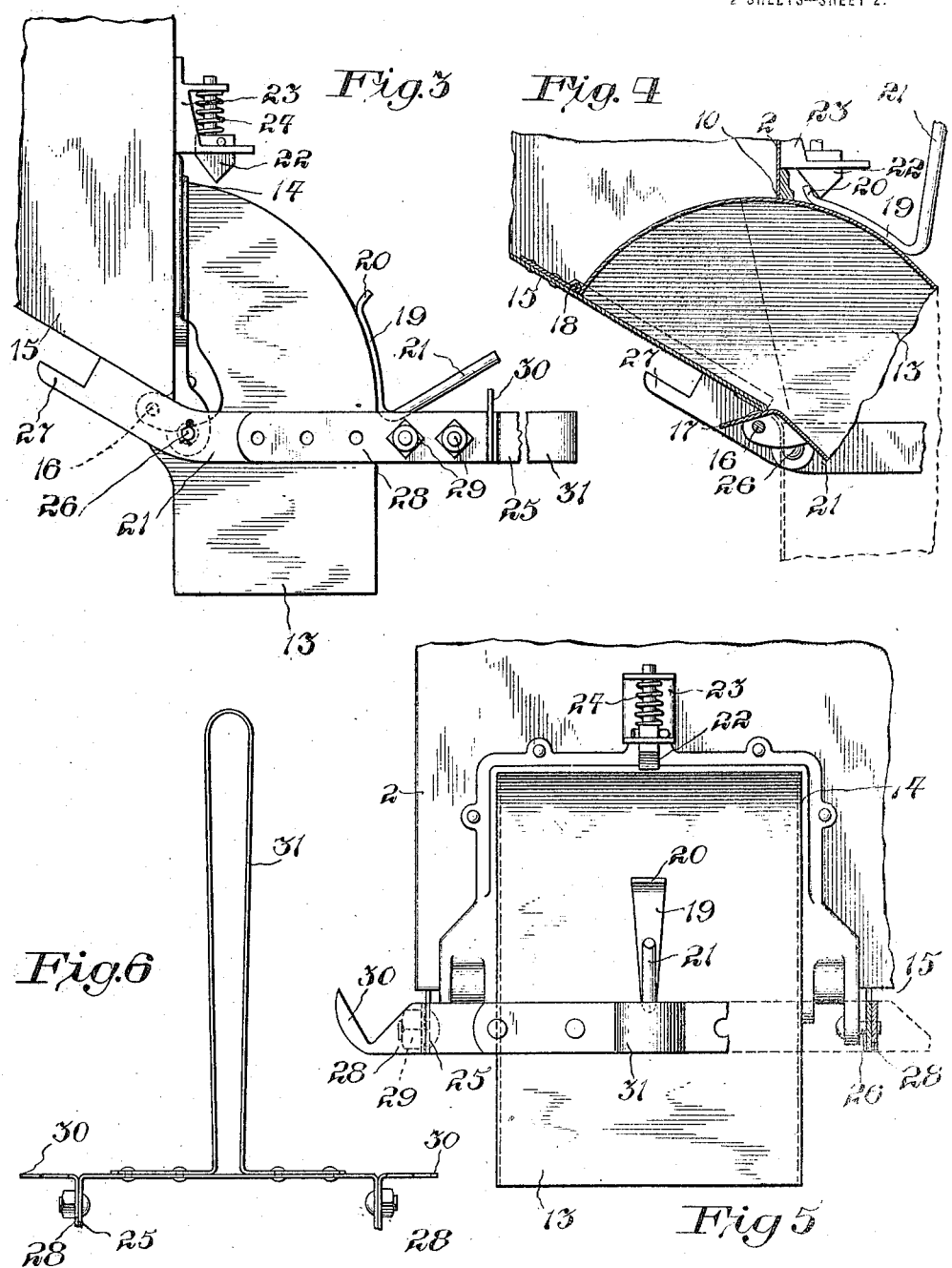

UNITED STATES PATENT OFFICE.

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

BAGGING MECHANISM FOR HARVESTER THRESHERS OR STRIPPERS.

1,301,362.     Specification of Letters Patent.     Patented Apr. 22, 1919.

Application filed January 12, 1916. Serial No. 71,636.

*To all whom it may concern:*

Be it known that I, BERT R. BENJAMIN, a citizen of the United States, residing at Oak Park, in the county of Cook and State of Illinois, have invented certain new and useful Improvements in Bagging Mechanism for Harvester Threshers or Strippers, of which the following is a full, clear, and exact specification.

My invention relates to bagging mechanism for harvester threshers or strippers.

It has for its object to provide an improved bagging mechanism whereby an operator is enabled to bag the threshed grain with greater facility. A more specific object of my invention is to provide an improved bagging mechanism wherein the grain passing from the grain box to the bag is shut off when the bag is filled in such a manner that a plurality of bags may be attended to at the same time by a single operator. Further objects of my invention are to provide improved means for delivering the grain to the grain box and the bags and improved coöperating means for supporting the bags to which the grain is delivered.

In order that my invention may be clearly and fully disclosed, I have illustrated in the accompanying drawings one embodiment which the same may assume in practice.

In these drawings:

Fig. 3 is a detail end elevation of one of the grain chutes;

Fig. 4 is a sectional view of a part of the chute mechanism shown in Fig. 3;

Fig. 5 is a side elevation of that mechanism;

Fig. 6 is a detail view of a part of the bag holding means.

Figure 1:
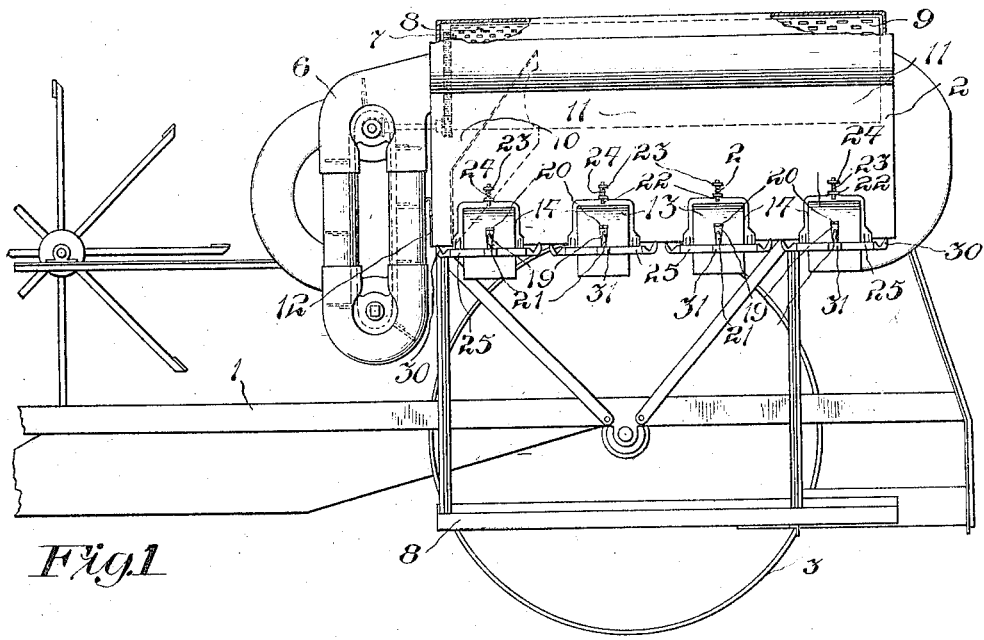
Figure 1 is a side elevation of a harvester thresher equipped with my improvement.
Figure 2:
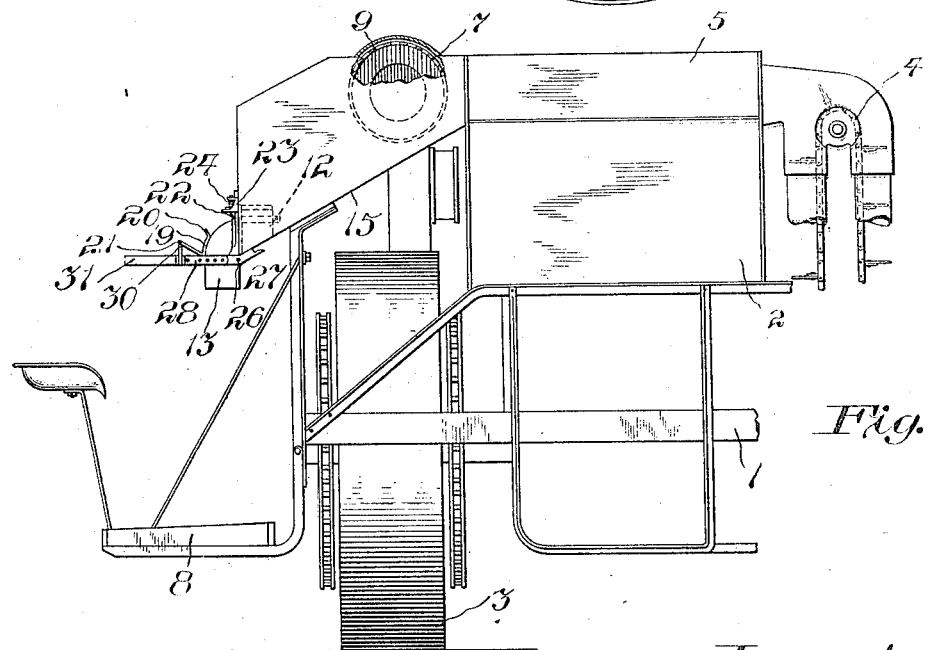
Fig. 2 is a rear view of the mechanism shown in Fig. 1.

The harvester thresher shown includes a frame 1 and a grain box 2 mounted above the main wheel 3, this grain box receiving the grain from an elevator 4 which delivers it into a separator and cleaner 5, which in turn delivers it through connections (not shown) to a second elevator 6 delivering the grain to a cylindrical rotating screen 7 having fine and coarse mesh, sections 8 and 9 delivering the dirt and grain, respectively, into compartments 10 and 11, the screen being driven from a suitable moving part of the machine; as, for instance, the elevator 6, and extending longitudinally above the grain box 2. Disposed along the stubbleward side of this box 2 is the bag filling mechanism, which is attended to by an operator standing or seated upon a platform 8.

As shown, the dirt is removable through a suitable gate 12 in the vertical front wall of the box, and a series of longitudinally spaced delivery chutes 13 is carried at the stubbleward side of this box 2, these delivery chutes being of the construction shown in Figs. 3, 4 and 5 and comprising tubular chute members movable through suitable correspondingly shaped openings 14 in the vertical side wall of the box 2 and provided with curved or elbow-like inner ends, open so that when they are in the grain delivering position thereof shown in Fig. 3, the grain in the box may pass freely therethrough and downward to the bags, and when they are in the inoperative position shown in Fig. 4, their upper ends will rest against the inclined bottom 15 of the grain box, the openings 14 then being closed. As shown, these chutes are pivoted at 16 on the box at points beneath the openings 14 and are provided with lips 17 movable therewith and extending between the bottom 15 and their pivots in such a manner as to seal the opening, suitable ribs 18 also being provided upon the bottom of the box to prevent any leakage of grain under the chutes when the latter are in closed position. Carried upon each of these chutes is a combined handle and latch engaging member 19, having an upwardly extending rib or tail portion 20 at one end and a handle 21 at the other, the tail portions 20 being engageable with a vertically reciprocable spring detent member 22 mounted in a bracket 23 above the chute and normally depressed by a coiled spring 24, the tail portion 20 being pushed in under the detent 22 and elevating the same when the chutes are raised to the position shown in Fig. 4, the springs 24 subsequently pushing the detents down so that the chutes may be held against accidental opening.

Coöperating with each chute is a substantially U-shaped bag holding member 25 having its arms pivoted at 26 to the box at points outside the chute pivots, and extending beneath the box. As shown, the arms of this member are provided with hooks or bag piercing and supporting members 27 at their rear ends, while the same at their front ends carry adjustable laterally extending bag holding members 28 adjustably attached thereto by means of nut and bolt connections 29. As illustrated, these members 28 are provided with laterally extending bag hooks 30, which are obviously adjustable toward or from the chute to accommodate bags of different size by adjustment of the nut and bolt connections 29, a plurality of bolt holes being provided to permit the adjustment. It is also to be noted that a handle 31 is attached to the front end of the member 25, so that an operator may lift the bag holding means when desired; as, for instance, when shaking down the grain in a bag, and that, when the operator raises the handle 31, through the engagement thereof with the handle 21, the chute may be closed at the same time.

In the operation of my improved construction it is obvious that as grain is delivered from the elevator 6 into the screen 7, it will have all dirt, weed seed, etc., separated from it and connected in the compartment 10, while the grain will be delivered to the compartment 11 and the several chutes 13, the greatest amount of grain normally being delivered to the two center chutes (Fig. 1). Further, it will be noted that, through the provision of my improved chutes, when the same are in open position the delivery of grain will be shut off therefrom as soon as the bags are filled. This shutting off of the delivery of the grain takes place as soon as the bottom of the chute is covered with grain, the grain itself acting as a stop and preventing the accumulation of any more grain in the bag. Thus, a single operator may both drive and attend to the bagging of the grain, since it will be necessary to give the latter attention at infrequent intervals; i. e., when all the bags and the grain box are filled. It will be noted that when two are employed, the one riding on the platform is thus also able to work without interruption in replacing and sewing the bags, as it is not necessary for him to shut off any of the chutes until he desires to remove the filled bag and replace it with an empty bag. Under these conditions the operator will also be given ample leeway in which to sew the bags due to the large capacity of the box. Of course, whenever any operator desires to shut off the supply of grain from any bag for any reason; as, for instance, when removing the filled bag and placing an empty bag in position, he may readily do so by raising the chute through the levers 21 or 31, the detent mechanism automatically retaining the chute in raised position and enabling release of the same whenever the operator desires to again use the chute.

While I have in this application specifically described one embodiment which my invention may assume in practice, it is, of course, to be understood that the invention may be embodied in other forms and modified without departing from its spirit, it being my intention to include all such modifications of my invention within the scope of the appended claims.

What I claim as new is:

1. In combination, a grain box having an inclined floor and an upwardly extending outer wall provided with a grain opening therein, a grain chute pivotally mounted on said box and disposed in said opening having its receiving end movable into engagement with said bottom to close said opening, and means carried by said chute for preventing the escape of grain between said box and said chute in all positions of adjustment of said chute.

2. In a bag filling mechanism, a grain box having an inclined floor and an upwardly extending outer wall provided with a grain opening therein, a grain chute pivotally mounted on said box and disposed in said opening having its receiving end movable into engagement with said bottom to close said opening, and spring detent mechanism engageable with said chute when the latter is moved to outlet closing position for retaining the same therein.

3. In a bag filling mechanism, a grain box having an inclined floor and an upwardly extending outer wall provided with a grain opening therein, a grain chute pivotally mounted on said box and disposed in said opening having its receiving end movable into engagement with said bottom to close said opening, bag holding mechanism pivotally disposed below said chute, and means on said bag holding mechanism for raising said chute as the former is swung upwardly about its pivot.

4. In a bag filling mechanism, a grain box having an inclined floor and an upwardly extending outer wall provided with a grain opening therein, a grain chute pivotally mounted on said box and disposed in said opening having its receiving end movable into engagement with said bottom to close said opening, bag holding means pivoted beneath said chute, and means whereby as said bag holding means is moved about its pivot said chute is moved to close said opening.

5. In a bag filling mechanism, a grain receptacle having a discharge opening, means for closing said opening, movable bag holding means adjacent said opening for holding a bag in position to receive the grain discharged through said opening, and means whereby as said bag holding means is moved in a predetermined direction, said closing means is moved to close said opening.

6. In a bag filling machine, a grain receptacle having a discharge opening, pivoted means for closing said opening, pivoted bag holding means adjacent said opening for holding a bag in position to receive the grain discharged through said opening, and means whereby as said bag holding means is moved about its pivot said closing means is moved to close said opening.

7. In a bag filling machine, a grain receptacle having a discharge opening, a grain chute receiving the grain from said receptacle and movable to a position to close said opening, movable bag holding means adjacent said chute for holding a bag in position to receive the grain passing through said chute, and means whereby as said bag holding means is moved in a predetermined direction said chute is moved to close said opening.

8. In a bag filling machine, a grain receptacle having a discharge opening, a grain chute pivoted to said receptacle and receiving the grain from said opening and movable to a position to close said opening, pivoted bag holding means adjacent said chute for holding a bag in position to receive the grain passing through said chute, and means whereby as said bag holding means is moved about its pivot, said chute is moved to close said opening.

In testimony whereof I affix my signature.

BERT R. BENJAMIN.

Copies of this patent may be obtained for five cents each, by addressing the "Commissioner of Patents, Washington, D. C."